United States Patent
Kim

(10) Patent No.: US 11,296,341 B2
(45) Date of Patent: Apr. 5, 2022

(54) METHOD AND SYSTEM FOR CONTROLLING STARTUP OF FUEL CELL

(71) Applicants: Hyundai Motor Company, Seoul (KR); Kia Motors Corporation, Seoul (KR)

(72) Inventor: Dae Jong Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 427 days.

(21) Appl. No.: 15/818,267

(22) Filed: Nov. 20, 2017

(65) Prior Publication Data

US 2018/0342747 A1 Nov. 29, 2018

(30) Foreign Application Priority Data

May 23, 2017 (KR) .................. 10-2017-0063373

(51) Int. Cl.

| | |
|---|---|
| *H01M 8/04302* | (2016.01) |
| *H01M 8/04537* | (2016.01) |
| *H01M 8/04858* | (2016.01) |
| *H01M 8/04746* | (2016.01) |
| *B60L 58/40* | (2019.01) |
| *B60L 58/31* | (2019.01) |
| *B60L 58/20* | (2019.01) |
| *H01M 16/00* | (2006.01) |

(52) U.S. Cl.
CPC ......... *H01M 8/04302* (2016.02); *B60L 58/20* (2019.02); *B60L 58/31* (2019.02); *B60L 58/40* (2019.02); *H01M 8/04567* (2013.01); *H01M 8/04626* (2013.01); *H01M 8/04753* (2013.01); *H01M 8/04917* (2013.01); *B60L 2210/14* (2013.01); *H01M 16/006* (2013.01); *H01M 2250/20* (2013.01)

(58) Field of Classification Search
CPC ........................... H01M 8/04302; H01M 8/00
See application file for complete search history.

(56) References Cited

U.S. PATENT DOCUMENTS

| | | | | |
|---|---|---|---|---|
| 2010/0089672 A1* | 4/2010 | Lee | ........................... | B60L 7/16 180/65.275 |
| 2015/0288041 A1* | 10/2015 | Forte | ................... | H01M 8/1018 429/9 |

FOREIGN PATENT DOCUMENTS

| | | |
|---|---|---|
| JP | 5061555 | 10/2012 |
| KR | 10-1448756 | 10/2014 |
| KR | 10-1592377 | 2/2016 |

OTHER PUBLICATIONS

Lee et al. KR 101448756. Oct. 8, 2014. English translation. (Year: 2014).*

* cited by examiner

*Primary Examiner* — James Lee
(74) *Attorney, Agent, or Firm* — Mintz Levin Cohn Ferris Glovsky and Popeo, P.C.; Peter F. Corless

(57) ABSTRACT

A method and a system for controlling startup of a fuel cell are provided. The method includes sensing a startup request signal and boosting a Bi-directional high-voltage DC/DC Converter (BHDC) of a main bus stage when the startup request signal has been sensed by a controller. A valve of an air/hydrogen line is then opened together with the boosting of the BHDC and the startup of the fuel cell is completed by allowing an output of the fuel cell after the valve of the air/hydrogen line is opened.

5 Claims, 3 Drawing Sheets

METHOD AND SYSTEM FOR CONTROLLING STARTUP OF FUEL CELL

CROSS REFERENCE TO RELATED APPLICATION

The present application claims priority of Korean Patent Application No. 10-2017-0063373 filed on May 23, 2017, the entire contents of which is incorporated herein for all purposes by this reference.

BACKGROUND

1. Field of the Invention

The present invention relates to a method and a system for controlling the startup of a fuel cell which parallelize and optimize a startup process of the fuel cell, and thus provide a driver with the output of the fuel cell within a reduced period of time.

2. Description of the Prior Art

A fuel cell is a power generation system which directly converts chemical energy of fuel into electrical energy. A fuel cell is configured with unit cells, each of which includes a pair of anode and cathode electrodes with an electrolyte there in between. Hydrogen is supplied to an anode electrode of a unit cell and oxygen is supplied to a cathode electrode thereof, and thus, electricity is generated through a chemical reaction of an ionized material. Since the fuel cell does not go through a combustion reaction of fossil fuel, the fuel cell does not discharge harmful substances and has high power generation efficiency, and accordingly, is applied as a power source to a vehicle.

A fuel cell vehicle is a hybrid vehicle which uses both a fuel cell and a high-voltage battery as power sources. Accordingly, in a state where the two power sources are normal, the fuel cell vehicle is capable of providing maximum output power. In a conventional fuel cell startup process, all procedures sequentially progress and a vehicle is capable of being driven using a high-voltage battery in an electric vehicle (EV) startup completion state, but a time period of about 7 to 8 seconds is required until the startup of a fuel cell system is completed and the output of a fuel cell is available. Accordingly, a long time period of 7 to 8 seconds is required until a driver obtains sufficient output power for starting thus decreasing user convenience.

In addition, the fuel cell startup process includes supplying air to a stack and identifying whether the voltage of the stack is normal. To operate an air compressor to supply air to the stack, the voltage of a high-voltage battery needs to be boosted by a Bi-directional high-voltage DC/DC Converter (BHDC), and the air compressor needs to be driven by the boosted voltage of the high-voltage battery. Accordingly, after the boosting of the BHDC is completed, a startup process of the fuel cell system is performed. This configuration increases a startup time period of the fuel cell and causes the stack to be exposed to an open circuit voltage (OCV) in each startup process, and thus has a negative influence on durability. This configuration also causes the air compressor to operate to supply unnecessary air, and thus causes a waste of energy.

Specifically, referring to FIG. 1, when a startup request signal has been sensed in a step S100 of sensing a startup request signal, the process goes through a step S300 of connecting a high-voltage battery before a step S400 of boosting a BHDC, completes a step S500 of operating a low-voltage DC-DC Converter (LDC) after the step S400 of boosting the BHDC, and then sequentially proceeds to a step S600 of opening a valve of an air/hydrogen line and operating a recirculation blower which includes a step S610 of opening an air shutoff valve and a step S620 of supplying hydrogen and purging hydrogen, and driving a recirculation blower. Further, as a step S700 of identifying whether the voltage of a stack is normal, the process proceeds to a step S710 of supplying air to the stack and a step S720 of identifying the voltage of the stack, and completes the startup of a fuel cell, in step S800. Accordingly, conventionally, all of the steps are sequentially performed according to a scheme for finishing an EV startup and starting up a fuel cell system, and a long time period is required for the completion of the startup.

The information disclosed in this background section is merely for enhancement of understanding of the general background of the invention and should not be taken as an acknowledgement or any form of suggestion that this information forms the prior art already known to those skilled in the art.

SUMMARY

The present invention provides a method and a system for controlling the startup of a fuel cell which perform a startup process of a fuel cell system using a low-voltage battery of the fuel cell in parallel with a boosting process of a BHDC, eliminate a process of supplying air to the fuel cell and identifying a stack voltage, and thus, reduce a startup time period and allow the output of the fuel cell to be available without delay.

In accordance with an aspect of the present invention, a method for controlling startup of a fuel cell may include: sensing, by a controller, a startup request signal; boosting, by the controller, a Bi-directional high-voltage DC/DC Converter (BHDC) of a main bus stage when the startup request signal has been sensed; opening, by the controller, a valve of an air/hydrogen line together with the boosting of the BHDC; and completing the startup of the fuel cell by allowing an output of the fuel cell after the valve of the air/hydrogen line is opened. The opening of the valve of the air/hydrogen line may include opening the valve of the air/hydrogen line using charged power of a low-voltage battery.

The method may further include, after recognizing an intention of a driver for startup, monitoring a charged amount of the low-voltage battery. When the monitored charged amount of the low-voltage battery is greater than or equal to a preset charged amount, the opening of the valve of the air/hydrogen line is performed together with the boosting of the BHDC. Additionally, when the monitored charged amount of the low-voltage battery is less than the preset charged amount, the opening of the valve of the air/hydrogen line is performed after the BHDC is boosted.

After completing the startup of the fuel cell, air may be supplied to the fuel cell. The opening of the valve of the air/hydrogen line may include purging hydrogen. The boosting of the BHDC of the main bus stage may include operating a low-voltage DC-DC Converter (LDC) after the BHDC is boosted. The boosting of the BHDC of the main bus stage may include connecting a high-voltage battery to the main bus stage before the BHDC is boosted.

In accordance with another aspect of the present invention, a system for controlling startup of a fuel cell may include: a Bi-directional high-voltage DC/DC Converter (BHDC) included in a main bus stage; a valve installed in an air/hydrogen line and configured to adjust a flow of air/hydrogen; and a controller configured to sense a startup request signal, boost the BHDC of the main bus stage together with opening the valve of the air/hydrogen line, when the startup request signal has been sensed, and allow an output of the fuel cell after the valve of the air/hydrogen line is opened.

The system may further include a low-voltage battery monitoring unit configured to monitor a charged amount of a low-voltage battery. When the charged amount of the low-voltage battery monitored by the low-voltage battery monitoring unit is greater than or equal to a preset charged amount, the controller may be configured to open the valve of the air/hydrogen line together with boosting the BHDC, and when the monitored charged amount of the low-voltage battery is less than the preset charged amount, the controller may be configured to open the valve of the air/hydrogen line after the BHDC is boosted.

The method and the system for controlling startup of a fuel cell according to the present invention may optimize a startup procedure and reduce a time period allowing the output of the fuel cell. Additionally, the method and the system ensure durability by preventing a stack of the fuel cell from being exposed to an OCV during startup, and reduce consumed power of an air compressor by preventing the unnecessary supply of air during startup.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION

Hereinafter, exemplary embodiments of the present invention will be described with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1:
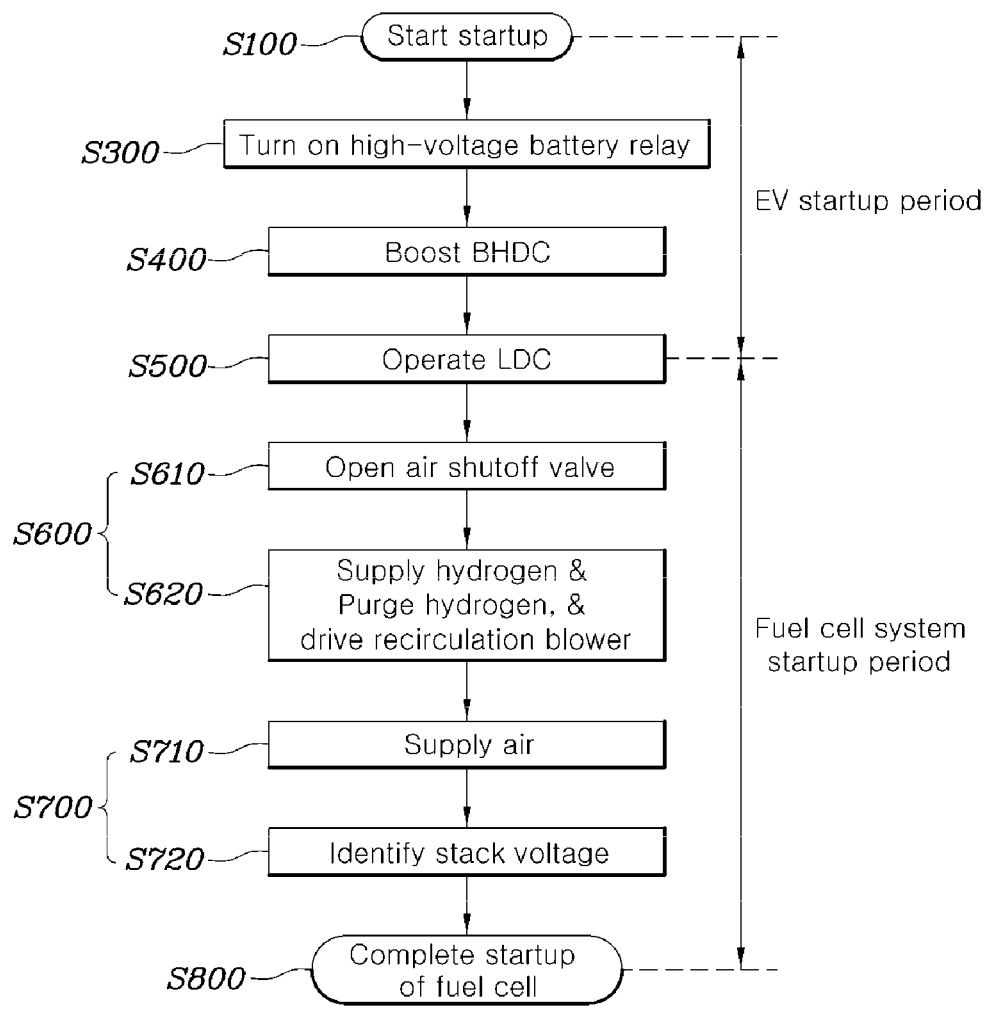
FIG. 1 is a flowchart illustrating a conventional sequential startup process according to the related art.
Figure 2:
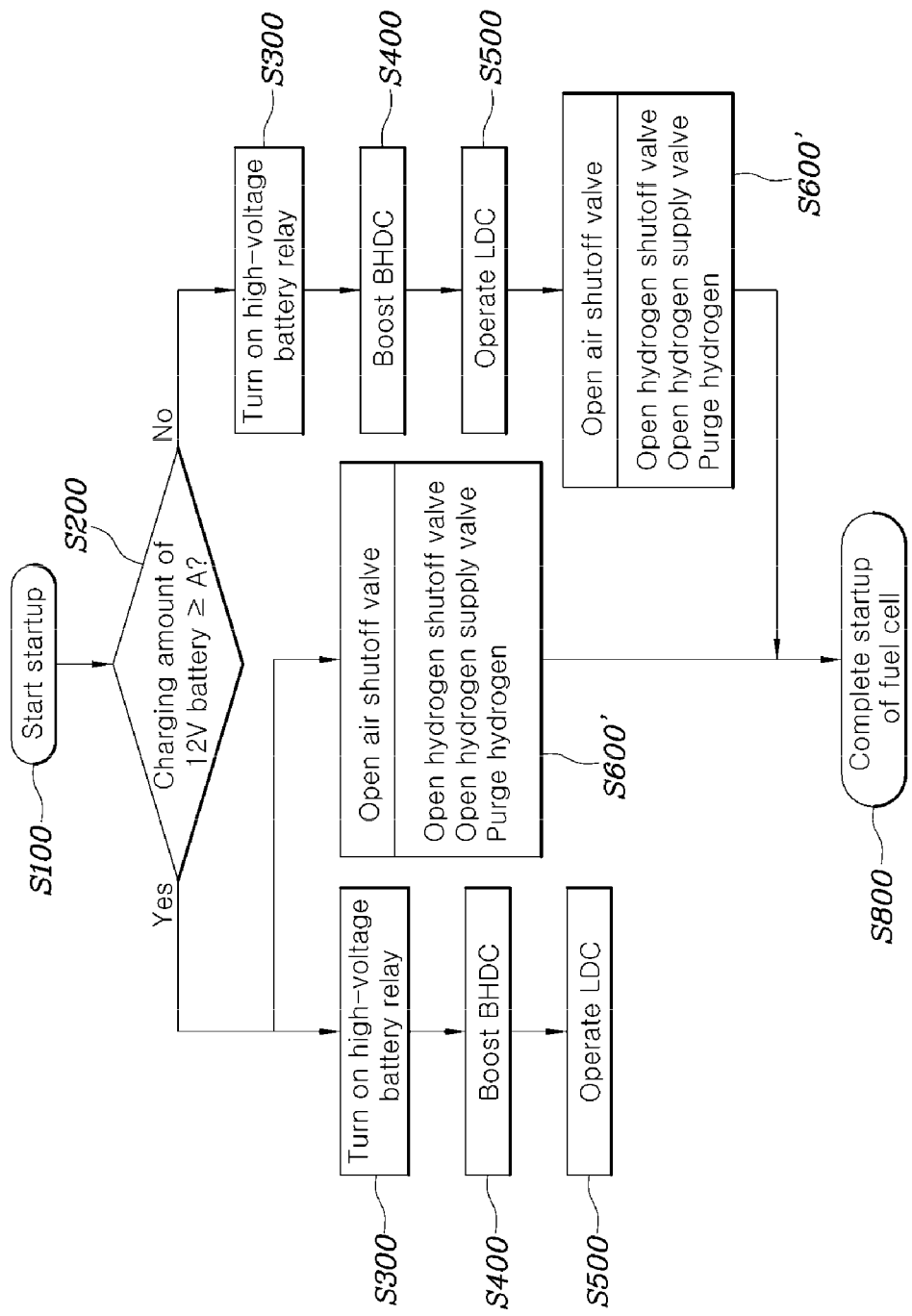
FIG. 2 is a flowchart illustrating a startup process according to a fuel cell startup control method according to an exemplary embodiment of the present invention.
Figure 3:
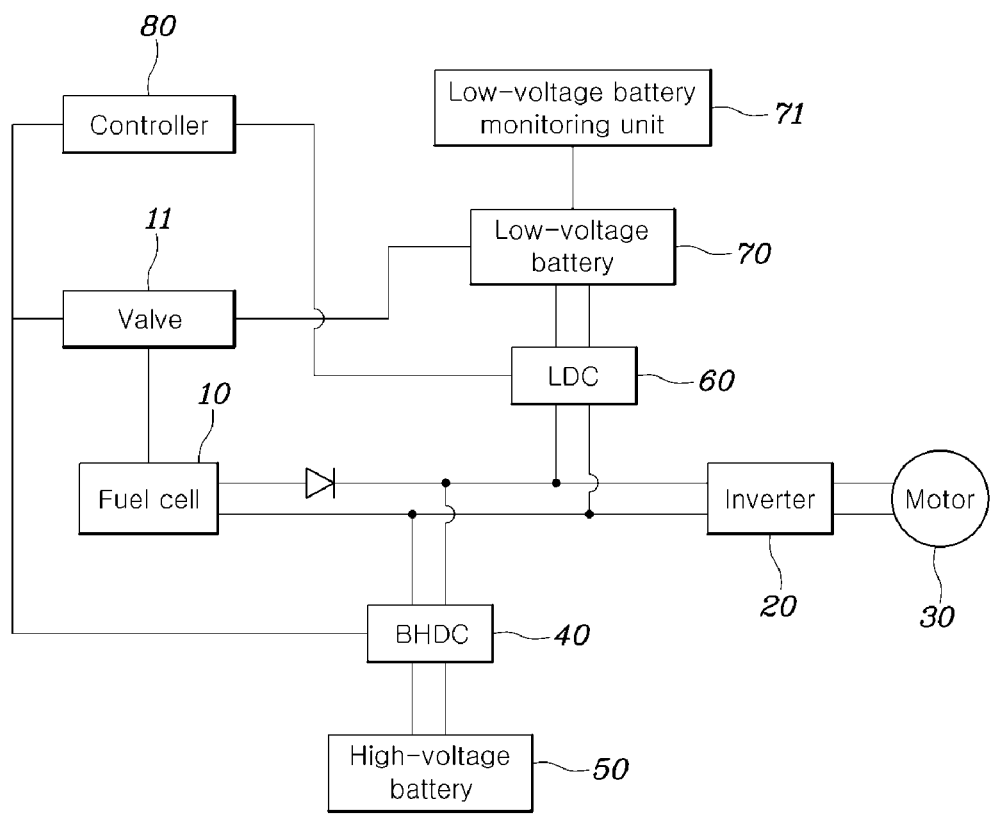
FIG. 3 is a block diagram illustrating a configuration of a fuel cell startup control system according to an exemplary embodiment of the present invention.

FIG. 2 is a flowchart illustrating a startup process according to a fuel cell startup control method according to an exemplary embodiment of the present invention. FIG. 3 is a block diagram illustrating a configuration of a fuel cell startup control system according to an exemplary embodiment of the present invention. The methods described herein below may be executed by a controller having a processor and a memory.

As illustrated in FIG. 2, the fuel cell startup control method according to the present invention may include: sensing a startup request signal (S100); boosting a BHDC of a main bus stage when the startup request signal has been sensed (S400); opening a valve of an air/hydrogen line together with the boosting of the BHDC (S600'); and completing startup of a fuel cell by allowing an output of the fuel cell after the valve of the air/hydrogen line is opened (S800).

Additionally, the fuel cell startup control method may further include monitoring a charged amount of a low-voltage battery (S200), after recognizing an intention of a driver for startup (e.g., a user startup intention); opening the valve of the air/hydrogen line together with boosting the BHDC, when the monitored charged amount of the low-voltage battery is greater than or equal to a preset charged amount; and opening the valve of the air/hydrogen line after the BHDC is boosted, when the monitored charged amount of the low-voltage battery is less than the preset charged amount.

As illustrated in FIG. 3, the fuel cell startup control system according to the present invention may include: a BHDC 40 included in a main bus stage; a valve 11 installed in an air/hydrogen line and configured to adjust a flow of air/hydrogen; and a controller 80 configured to sense a startup request signal, execute boosting the BHDC 40 of the main bus stage together with opening the valve 11 of the air/hydrogen line, when the startup request signal has been sensed, and allow (e.g., permit) an output of a fuel cell 10 after the valve 11 of the air/hydrogen line is opened.

Further, as an exemplary embodiment, the fuel cell startup control system may further include a low-voltage battery monitoring unit 71 configured to monitor a charged amount of a low-voltage battery 70. When the charged amount of the low-voltage battery 70 monitored by the low-voltage battery monitoring unit 71 is greater than or equal to a preset charged amount, the controller 80 may be configured to open the valve 11 of the air/hydrogen line together with the boosting of the BHDC 40. When the monitored charged amount of the low-voltage battery 70 is less than the preset charged amount, the controller 80 may be configured to open the valve 11 of the air/hydrogen line after the BHDC 40 is boosted.

Referring to FIGS. 2 and 3 together, in the step S100 of sensing a startup request signal by the controller 80, when a driver inputs a signal for requesting startup, for example, when a start button is engaged or a vehicle key is inserted, the controller 80 may be configured to sense the input startup request signal. In the step S400 of boosting the BHDC 40 of the main bus stage when the startup request signal has been sensed by the controller 80, a voltage is generated capable of operating high-voltage components, such as a motor 30, an air compressor (not illustrated), and the like, connected to an inverter 20 of the main bus stage by boosting the BHDC 40.

In the step S600' of opening the valve 11 of the air/hydrogen line together with boosting the BHDC 40, the valve 11 installed in a passage of air and hydrogen, which are supplied or discharged to/from the fuel cell 10, may be opened simultaneously with the step S400 of boosting the BHDC 40 of the main bus stage when the startup request signal has been sensed by the controller 80. Particularly, the step S600' may include the step S610 of opening the air shutoff valve and the step S620 of opening a hydrogen shutoff valve and opening a hydrogen supply valve. In the step S800 of completing the startup of the fuel cell by allowing the output of the fuel cell by the controller 80 after opening the valve 11 of the air/hydrogen line, when the step S600' of opening the valve 11 of the air/hydrogen line has been completed, a step of supplying air to the stack of the fuel cell 10 and identifying a voltage of the stack may be omitted and the startup of the fuel cell may be completed. Accordingly, when the step S600' of opening the valve 11 of the air/hydrogen line has been completed, the step S800 may immediately allow the output of the fuel cell 10.

In the step S600' of opening the valve 11 of the air/hydrogen line, the valve 11 of the air/hydrogen line may be opened with charged power of the low-voltage battery 70. This configuration allows the valve 11 of the air/hydrogen line to be opened using power of the low-voltage battery 70 being charged, before the completion of operations of the BHDC 40 and an LDC 60. Accordingly, a battery charging capacity may be increased to provide the low-voltage battery 70 with sufficient charging capacity.

Conventionally, a startup process includes a process of driving a recirculation blower (not illustrated) using a low-voltage power source. In this respect, the amount of power consumed to start the driving of the recirculation blower is substantial, and thus, there is significant concern regarding a voltage drop when the recirculation blower is driven by only the low-voltage battery 70 before an operation of the LDC 60. Accordingly, a sequential startup process is required for driving the recirculation blower and opening the valve 11 of the air/hydrogen line using the low-voltage power source after the operation of the LDC 60 is completed. In the present invention, since a recirculation flow is ensured by enhancing an ejector system, a recirculation blower may not be driven in a startup process, or a recirculation blower driving step may be eliminated from the beginning, and thus, the startup process may be performed using charged power of the low-voltage battery 70 before an operation of the LDC 60.

After the step S100 of recognizing an intention of a driver for startup, the method may further include a step S200 of monitoring a charged amount of the low-voltage battery 70 by the low-voltage battery monitoring unit 71. When the monitored charged amount of the low-voltage battery 70 is greater than or equal to a preset charged amount A, the controller 80 may be configured to open the valve of the air/hydrogen line together with the step S400 of boosting the BHDC 40. When the monitored charged amount of the low-voltage battery 70 is less than the preset charged amount A, the controller 80 may be configured to open the valve of the air/hydrogen line after the BHDC 40 is boosted in step S400.

After the step S100 of recognizing an intention of a driver for startup, in the step S200 of monitoring a charged amount of the low-voltage battery 70, the low-voltage battery monitoring unit 71 may be configured to determine whether the charged amount of the low-voltage battery is sufficient to be used as power for opening the valve 11 of the air/hydrogen line. Accordingly, a battery may be used as the low-voltage battery 70, wherein a state-of-charge (SOC) of the battery may be detected. For example, when a lithium-ion battery is used as the low-voltage battery 70, a SOC of the battery may be determined and a charged amount of the low-voltage battery 70 may be monitored.

When a charged amount of the low-voltage battery 70, which has been monitored by the low-voltage battery monitoring unit 71 in the step S200 of monitoring the charged amount of the low-voltage battery 70, is greater than or equal to the preset charged amount A, the controller 80 may be configured to open the valve 11 of the air/hydrogen line simultaneously with the step S400 of boosting the BHDC 40 of the main bus stage, and may reduce a time period required for the completion of startup. In particular, the preset charged amount A depends on a charging capacity of the used low-voltage battery 70, and may be set to a charging capacity having a dischargeable output which is greater than or equal to power consumed to open the valve 11 of the air/hydrogen line.

In contrast, when the charged amount of the low-voltage battery 70, which has been monitored by the low-voltage battery monitoring unit 71 in the step S200 of monitoring the charged amount of the low-voltage battery 70, is less than the preset charged amount, the charged amount of the low-voltage battery 70 does not have a dischargeable output which is greater than or equal to power consumed to open the valve 11 of the air/hydrogen line, and the controller 80 may be configured to open the valve of the air/hydrogen line, after an operation of the LDC 40 after the BHDC 40 is boosted.

After the step S800 of completing startup of a fuel cell, air may be supplied to the fuel cell 10. Conventionally, in a fuel cell startup process, a step of supplying air to a stack and determining whether a voltage of the stack is normal is essential. Accordingly, whenever a startup process is performed, a cell of the fuel cell is exposed to a voltage close to an OCV, and a voltage close to the OCV is maintained until the output of the fuel cell even after the completion of the startup, which causes the degradation of a cell of the fuel cell. Additionally, energy is consumed by driving an air compressor (not illustrated) to supply air during startup.

Accordingly, the above-described problem may be solved by omitting the step of supplying air to a stack and identifying a voltage of the stack in a fuel cell startup process, and air may be supplied to the fuel cell 10 when the output of a fuel cell is required after the completion of startup. The step S600' of opening the valve of the air/hydrogen line may include a step of purging hydrogen. Nitrogen within the air may serve as an impurity on the side of a hydrogen pole by diffusion on the side of an air pole. For hydrogen purge, a purge valve may be provided at an exit on the side of an anode of the fuel cell to remove nitrogen which is an impurity, and may adjust the discharge amount of hydrogen including impurities.

The step S400 of boosting the BHDC 40 of the main bus stage may include a step S500 of operating the LDC 60 after the BHDC 40 is boosted in step S400. Additionally, the step S400 of boosting the BHDC 40 of the main bus stage may include a step S300 of connecting a high-voltage battery 50 to the main bus stage, before the BHDC 40 is boosted in step S400. Specifically, the step S400 of boosting the BHDC 40 of the main bus stage follows the step S300 of operating a relay, which connects a high-voltage battery 50 to the main bus stage, before the BHDC 40 is boosted, and the step S400 of boosting the BHDC 40 precedes step S500 to operate the LDC 60 in step S500. Accordingly, the step S300 of connecting the high-voltage battery 50 to the main bus stage, the step S400 of boosting the BHDC 40, and the step S500 of operating the LDC 60 may be performed sequentially.

While the present invention has been illustrated and described with reference to specific exemplary embodiments, it will be obvious to those having ordinary knowledge in the art to which the present invention pertains that the present invention may be variously improved and changed without departing from the technical idea of the present invention provided by the appended claims.

What is claimed is:

1. A method for controlling startup of a fuel cell, comprising:

sensing, by a controller, a startup request signal;

monitoring a charged amount of a low-voltage battery;

boosting, by the controller, a voltage of a high-voltage battery by a Bi-directional high-voltage DC/DC Converter (BHDC) of a main bus stage when the startup request signal has been sensed;

in response to determining that the monitored charged amount of the low-voltage battery is greater than or equal to a preset charged amount, opening, by the controller, a plurality of valves of air and hydrogen lines together with the boosting by the BHDC;

in response to determining that the monitored charged amount of the low-voltage battery is less than the preset charged amount, opening, by the controller, the plurality of valves of the air and hydrogen lines after the boosting by the BHDC; and completing, by the controller, the startup of the fuel cell by allowing an output of the fuel cell after the plurality of valves of the air and hydrogen lines are opened, wherein the plurality of valves of the air and hydrogen lines are opened by using charged power of the low-voltage battery.

2. The method as claimed in claim 1, wherein after the completing of the startup of the fuel cell, air is supplied to the fuel cell.

3. The method as claimed in claim 1, wherein the plurality of valves of the air and hydrogen lines are opened purging hydrogen.

4. The method as claimed in claim 1, wherein the boosting by the BHDC of the main bus stage includes operating a low-voltage DC-DC Converter (LDC) after boosting by the BHDC.

5. The method as claimed in claim 1, wherein the boosting by the BHDC of the main bus stage includes connecting the high-voltage battery to the main bus stage before boosting by the BHDC.

* * * * *